US012717605B2

(12) United States Patent
Tsirkin

(10) Patent No.: US 12,717,605 B2
(45) Date of Patent: Aug. 25, 2026

(54) EXTENDED PAGE TABLE FOR ENCRYPTED VIRTUAL MACHINES

(71) Applicant: Red Hat, Inc., Raleigh, NC (US)

(72) Inventor: Michael Tsirkin, Yokneam Illit (IL)

(73) Assignee: Red Hat, LLC, Raleigh, NC (US)

( * ) Notice: Subject to any disclaimer, the term of this patent is extended or adjusted under 35 U.S.C. 154(b) by 576 days.

(21) Appl. No.: 18/302,534

(22) Filed: Apr. 18, 2023

(65) Prior Publication Data

US 2024/0354137 A1 Oct. 24, 2024

(51) Int. Cl.
*G06F 9/455* (2018.01)

(52) U.S. Cl.
CPC .................... *G06F 9/45558* (2013.01); *G06F 2009/45583* (2013.01); *G06F 2009/45587* (2013.01)

(58) Field of Classification Search
CPC ........................................................ G06F 9/45
See application file for complete search history.

(56) References Cited

U.S. PATENT DOCUMENTS 7,334,076 B2 2/2008 Hendel et al.
8,015,388 B1 9/2011 Rihan et al.
8,631,212 B2 1/2014 Kegel et al.
9,274,974 B1 * 3/2016 Chen ..................... G06F 12/109
9,304,915 B2 4/2016 Adams et al.
9,336,036 B2 5/2016 Dong et al.
10,048,881 B2 8/2018 Sankaran et al.
10,789,174 B2 9/2020 Tsirkin et al.
2010/0250869 A1 * 9/2010 Adams ................ G06F 12/0802 718/1
2010/0250895 A1 * 9/2010 Adams ................ G06F 12/1036 718/1
2020/0097313 A1 * 3/2020 Dong .................. G06F 12/1036
2020/0125500 A1 * 4/2020 Guan .................. G06F 12/0873
2021/0318962 A1 * 10/2021 Tsirkin ................ G06F 12/1009
2023/0195652 A1 * 6/2023 Caspi .................. G06F 12/1408 711/164
2023/0298129 A1 * 9/2023 Puffer ................... G06F 12/109 345/520

OTHER PUBLICATIONS

Thyagaturu et al., "Operating Systems and Hypervisors for Network Functions: A Survey of Enabling Technologies and Research Studies," IEEE Access, vol. 10, 2022, 79825-79873. doi: 10.1109/ACCESS.2022.3194913.
Jin et al., "Architectural Support for Secure Virtualization under a Vulnerable Hypervisor," Appears in the 44th Annual IEEE/ACM International Symposium on Microarchitecture (MICRO-44), Dec. 3-7, 2011, Porto Alegre, Brazil, 12 pages. http://calab.kaist.ac.kr/~jhuh/papers/jin_micro11.pdf.

* cited by examiner

*Primary Examiner* — Lewis A Bullock, Jr.
*Assistant Examiner* — Christian M Bakhit
(74) *Attorney, Agent, or Firm* — Dority & Manning, P.A.

(57) ABSTRACT

The technology disclosed herein generates, by a virtual machine running on a host computer system, a plurality of direct guest physical addresses, maps each guest virtual address of a plurality of guest virtual addresses to a direct guest physical address of the plurality of direct guest physical addresses, and updates, for each guest virtual address to direct guest physical address mapping, an entry of a shadow page table with the direct guest physical address to a guest physical address mapping.

17 Claims, 5 Drawing Sheets

Generate, by a virtual machine running on a host computer system, a plurality of direct guest physical addresses

210

Map each guest virtual address of a plurality of guest virtual addresses to a direct guest physical address of the plurality of direct guest physical addresses

220

Update, for each guest virtual address to direct guest physical address mapping, an entry of a shadow page table with the direct guest physical address to a guest physical address mapping, wherein the shadow page table is used by a hypervisor running on the host computer system to generate an extended page table (EPT) mapping each direct guest physical address to a host physical address.

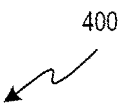

Identify, in memory of a hypervisor running on a host computer system, a shadow page table, wherein each entry of a plurality of entries of the shadow page table includes a direct guest physical address to guest physical address mapping

410

Generate, using the shadow page table, an extended page table mapping, wherein each entry of a plurality of entries of the extended page table mapping includes a direct guest physical address to host physical address mapping.

EXTENDED PAGE TABLE FOR ENCRYPTED VIRTUAL MACHINES

TECHNICAL FIELD

The present disclosure is generally related to continuous integration, and more particularly, to extended page table for encrypted virtual machines.

BACKGROUND

Virtualization is a computing technique that improves system utilization, decoupling applications from the underlying hardware, and enhancing workload mobility and protection. Virtualization can abstract some physical components into logical objects in order to allow running various software modules, for example, multiple operating systems, concurrently and in isolation from other software modules, on one or more interconnected physical computer systems. Virtualization may be realized through the implementation of virtual machines (VMs). A VM is a portion of software that, when executed on appropriate hardware, creates an environment allowing the virtualization of a physical computer system (e.g., a server, a mainframe computer, etc.). The physical computer system can be referred to as a "host machine," and the operating system of the host machine can be referred to as the "host operating system." A virtual machine may function as a self-contained platform, executing its own "guest" operating system and software applications.

Software operating as a layer above the hardware and below the virtual machines on the host machine can be referred to as a "hypervisor" (or a "virtual machine monitor") that can manage the execution of one or more virtual machines by providing a variety of functions such as virtualizing and allocating resources and context switching among virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization can be performed by having the hypervisor schedule time slots on one or more physical processors for a virtual machine without dedicating an entire physical processor exclusively to a single virtual machine. Memory virtualization can be achieved by utilizing a page table (PT) which is a data structure that can be used for translating virtual memory addresses to physical memory addresses or for translating guest memory addresses to host memory addresses.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2 depicts a flow diagram of an example method for extended page table for encrypted virtual machine, in accordance with one or more aspects of the present disclosure;

FIG. 4 depicts a flow diagram of an example method for extended page table for encrypted virtual machine, in accordance with one or more aspects of the present disclosure.

DETAILED DESCRIPTION

Figure 1:
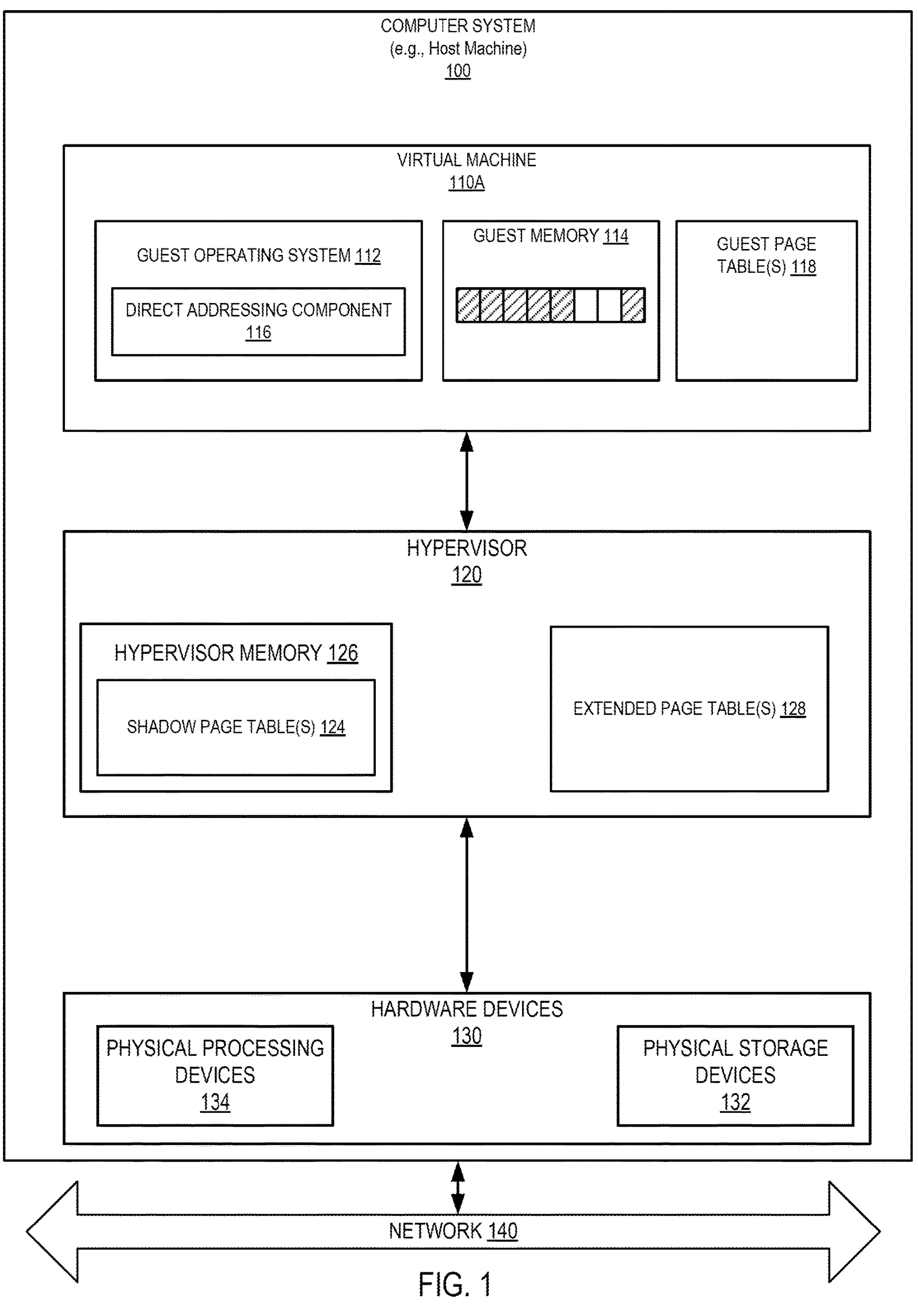
FIG. 1 depicts a high-level block diagram of an example computing environment including extended page table for encrypted virtual machines, in accordance with one or more aspects of the present disclosure.

Described herein are methods and systems for extended page tables for encrypted virtual machine. To perform virtualization, a central processing unit (CPU) of a host machine may use one or more sets of page tables to translate virtual addresses to physical addresses. For example, a first set of page tables may include guest page tables stored in guest memory of a virtual machine (e.g., guest), and a second set of page tables may include host page tables stored in host memory of a hypervisor. The guest page tables may translate guest virtual addresses (GVAs) to guest physical addresses (GPAs), and the host page tables may translate the GPAs, or in some cases the GVAs, to host physical addresses (HPAs) (e.g., actual memory locations).

In some implementations, second level address translation (SLAT), such as extended page tables, which virtualizes memory of guests by first translating GVAs to GPAs, which are then translated to HPAs. More specifically, depending on the paging technique, a first portion of the GVA is used to identify an entry in a page global directory (PGD). The entry of the PGD (e.g., PGD entry) stores a pointer to a page upper directory (PUD). A second portion of the GVA is used to identify an entry in the PUD (e.g., PUD entry). The PUD entry stores a pointer to a page middle directory (PMD). A third portion of the GVA is used to identify an entry in the PMD (e.g., PMD entry). The PMD entry stores a pointer to a page table (PT). A fourth portion of the GVA is used to identify an entry in the PT (PT entry). The PT entry stores a GPA of a memory page. A fifth portion of the GVA is used as an offset into the memory page itself. The host page table translates the GPA obtained from the PT entry to an HPA. While SLAT, using a memory management unit, efficiently virtualizes memory of guests to avoid additional work by the hypervisor (also known as a virtual machine monitor (VMM)). SLATs traversal through two sets of page tables may add virtualization overhead.

In some implementations, SLATs are disabled, and the hypervisor may be in control of the page tables (e.g., guest page tables and the host page tables), which provides improvement over the use of SLATs. However, since encrypted virtual machine (VM) memory utilizes is enabled via a flag in page tables. The hypervisor in control of the page tables may tamper (e.g., turn off) with encryption at will, thereby compromising the security of the VM.

Aspects of the present disclosure address the above-noted and other deficiencies by enabling extended page tables for encrypted virtual machines. Extended page tables map guest virtual addresses to host physical memory. For example, a guest operating system (e.g., guest OS) of a virtual machine may obtain a range of guest physical addresses outside a range of guest physical addresses allocated for guest memory by the hypervisor (e.g., direct guest physical addresses). The guest OS may update guest page tables to map guest virtual addresses to direct guest physical addresses. To minimize the traversal (or walk) of the guest page table by the CPU, entries of a page directory (e.g., global page directory, upper page directory, middle page directory etc.) are updated with a direct guest physical address of the direct guest physical addresses. Thus, the CPU does not need to traverse multiple levels of the page table to obtain the direct guest physical address. The guest OS may generate direct guest physical addresses to guest physical addresses based on the direct guest physical addresses mapped to guest virtual addresses. Each mapping between direct guest physical addresses and guest physical addresses is stored in shadow page tables stored in hypervisor memory. The hypervisor may use the shadow page tables stored in hypervisor memory to generate entries for an extended page table. Each entry of the extended page table maps direct guest physical addresses to host physical addresses.

Advantages of the present disclosure include, but are not limited to, increasing the speed of translation from a virtual address to a host physical address and securely enabling extended page tables for encrypted virtual machines.

FIG. 1 depicts an illustrative architecture of elements of a computer system 100, in accordance with an embodiment of the present disclosure. It should be noted that other architectures for computer system 100 are possible, and that the implementation of a computing device utilizing embodiments of the disclosure are not necessarily limited to the specific architecture depicted. Computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computer system 100 may be a computing device implemented with x86 hardware. In another example, computer system 100 may be a computing device implemented with PowerPC®, SPARC®, or other hardware. In the example shown in FIG. 1, computer system 100 may include a virtual machine 110, a hypervisor 120, a hardware device 130, and a network 140.

Virtual machine 110 may execute guest executable code that uses an underlying emulation of the physical resources. The guest executable code may include a guest operating system, guest applications, guest device drivers, etc. Virtual machine 110 may support hardware emulation, full virtualization, para-virtualization, operating system-level virtualization, or a combination thereof. Virtual machine 110 may have the same or different types of guest operating systems, such as Microsoft®, Windows®, Linux®, Solaris®, etc. Virtual machine 110 may execute guest operating system (e.g., guest OS) 112 that manages guest memory 114.

Guest memory 114 may be any virtual memory, logical memory, physical memory, other portion of memory, or a combination thereof for storing, organizing, or accessing data. Guest memory 114 may represent the portion of memory that is designated by hypervisor 120 for use by virtual machine 110. Guest memory 114 may be managed by guest operating system 112 and may be segmented into guest pages. The guest pages may each include a contiguous or non-contiguous sequence of bytes or bits and may have a page size that is the same or different from a memory page size used by hypervisor 120. Each of the guest page sizes may be a fixed-size, such as a particular integer value (e.g., 4 KB, 2 MB) or may be a variable-size that varies within a range of integer values.

Hypervisor memory 126 (e.g., host memory) may be the same or similar to the guest memory but may be managed by hypervisor 120, instead of a guest operating system. Hypervisor memory 126 may be segmented into guest pages, which may be in different states. The states may correspond to unallocated memory, memory allocated to guests. The unallocated memory may be guest memory pages that have not yet been allocated by hypervisor memory 126 or were previously allocated by hypervisor 120 and have since been deallocated (e.g., freed) by hypervisor 120. The memory allocated to guests may be a portion of hypervisor memory 126 that has been allocated by hypervisor 120 to virtual machine 110 and corresponds to guest memory of virtual machine 114. Other portions of hypervisor memory may be allocated for use by hypervisor 120, a host operating system, hardware device, other module, or a combination thereof.

Hypervisor 120 may provide virtual machines 110 with access to one or more features of the underlying hardware devices 130. In the example shown, hypervisor 120 may run directly on the hardware of computer system 100 (e.g., bare metal hypervisor). In other examples, hypervisor 120 may run on or within a host operating system (not shown). Hypervisor 120 may manage system resources, including access to hardware devices 130.

Hardware devices 130 may provide hardware resources and functionality for performing computing tasks. Hardware devices 130 may include one or more physical storage devices 132, one or more physical processing devices 134, other computing devices, or a combination thereof. One or more hardware devices 130 may be split up into multiple separate devices or consolidated into one or more hardware devices. Some of the hardware devices shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices (e.g., random access memory (RAM)), non-volatile memory devices (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 may include one or more processors that are capable of executing the computing tasks. Physical processing devices 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 134 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

Network 140 may be a public network (e.g., the internet), a private network (e.g., a local area network (LAN), a wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

In some implementations, guest OS 112 can additionally include a direct addressing component 116 to map a range of direct guest physical addresses outside a range of guest physical addresses of the guest memory 114 directly to a host physical address of hypervisor memory 126.

In particular, responsive to determining that guest OS 112 is running in an encrypted VM 110 or determining that an EPT is disabled, the direct addressing component 116 identifies a range of direct guest physical addresses outside the range of guest physical addresses of the guest memory 114. In some embodiments, the range of direct guest physical addresses outside is identified by guest OS 112 based on a configuration setting (e.g., an offset, a predetermined range, a location of a first direct guest physical address, etc.). Depending on the embodiment, the configuration settings may be provided to the guest OS 112 by the hypervisor 120. In some embodiments, each range of direct guest physical addresses may be determined for each application of the guest OS 112. For example, guest memory 114 may include addresses within a predetermined range (e.g., 0 to 16 gigabytes). In some embodiment, a first direct guest physical address of the direct guest physical addresses may start at an offset from the predetermined range (e.g., 1 terabyte offset from the last address of the guest memory 114). In some embodiments, the first direct guest physical address of the direct guest physical addresses may start at a predetermined guest physical address (e.g., address at 1 terabyte) that would not be within the range of guest physical addresses of the guest memory 114. The range of the direct guest physical addresses may be based on a predetermined size (e.g., 1 terabyte). Accordingly, the range of the direct guest physical addresses may be the predetermined size (e.g., 1 terabyte) from the first direct guest physical address of the direct guest physical addresses (determined by an offset or predetermined guest physical address). In some embodiment, the direct addressing component 116 may identify the range of direct guest physical addresses during allocating the guest physical address for guest memory 114.

The direct addressing component 116 identifies a range of guest virtual addresses to map to the range of direct guest physical addresses. In some embodiments, since each range of direct guest physical addresses is determined for each application of the guest OS 112, each range of guest virtual addresses is associated with the application.

The direct addressing component 116 updates guest page tables 118. In particular, for each guest virtual address of the range of guest virtual addresses, the direct addressing component 116 updates an entry of a page global directory (PGD) (identified by a first portion of the guest virtual address) with a direct guest physical address of the direct guest physical addresses. The range of direct guest physical addresses is contiguous, thus, the range of guest virtual addresses for translation can be confined within a few entries of a page directory (e.g., page global directory (PGD)). In some embodiments, the entry of PGD used to store the direct guest physical address has a page size (PS) bit set to 1. Otherwise, if the PS bit is set to 0, the entry of PGD stores a pointer to another page directory or page table.

In some embodiments, the direct addressing component 116 may update an entry of a page upper directory (PUD) (identified by a second portion of the guest virtual address) with direct guest physical address of the direct guest physical addresses, thus the entry of the PGD (identified by a first portion of the guest virtual address) is updated to point to the PUD. In some embodiments, the direct addressing component 116 may update an entry of a page middle directory (PMD) (identified by a third portion of the guest virtual address) with direct guest physical address of the direct guest physical addresses. Thus, the PGD (identified by a first portion of the guest virtual address) is updated to point to the PUD and an entry of the PUD (identified by a second portion of the guest virtual address) is updated to point to the PMD.

The direct addressing component 116 may update, based on the mapping of the guest virtual addresses to the direct guest physical addresses, a shadow page table 124 stored in hypervisor memory 126 of hypervisor 120 (e.g., host memory). In some embodiments, since each range of direct guest physical addresses and range of guest virtual addresses are associated with the application, the shadow page table 124 corresponds to the application. In each record, the shadow page table 124 stores a translation of the direct guest physical addresses to guest physical addresses. The shadow page table 124 represents a page table in which the guest OS 112 indicates to hypervisor 120 a state of translation the guest OS 112 expects from the hypervisor 120.

The hypervisor 120 utilizes the shadow page table 124 to generate an extended page table that translates direct guest physical addresses to host physical addresses of hypervisor memory 126. For each direct guest physical address of the direct guest physical addresses, the hypervisor 120 translates, using the shadow page table 124, the respective direct guest physical address to a guest physical address. The hypervisor 120 translates, using a host page table, the guest physical address associated with the respective direct guest physical address to a host physical address. The hypervisor 120 maps the direct guest's physical address to the host's address. The hypervisor updates an entry (or record) of an extended page table 128 with the mapping from the respective direct guest physical address to the host physical address.

In some embodiments, hypervisor 120 may periodically generate (or update) the extended page table (EPT) 128. For example, the hypervisor 120 may generate the EPT 128 every predetermined time period, once the shadow page table 124 has been updated, or at will. In some embodiments, the hypervisor 120 may generate (or update) the extended page table on demand. For example, the hypervisor 120 may detect that an application is attempting to access hypervisor memory 126 using a direct guest physical address and update the EPT 128 to translate the direct guest physical address to a host physical address for access.

The physical processing devices 134 may identify an application running on the guest OS 112. The physical processing devices 134 may determine that the identified application uses a virtual address to store or read data from hypervisor memory 126. The physical processing devices 134 perform guest page table 118 lookup to translate the virtual address. Depending on the virtual address, the physical processing devices 134 may translate, using the guest page table 118, the virtual address to a direct guest physical address (e.g., from PGD) without traversing multiple levels of the guest page table. The physical processing devices 134 may identify that a guest physical address is being used, thus performing an EPT 128 lookup. The physical processing devices 134 translates, using the EPT 128, the direct guest physical address to a host physical address. The physical processing devices 134 uses the host physical address to store and/or read data from a memory page associated with the host physical address.

FIG. 2 depicts a flow diagram of an example method 200 for extended page table for encrypted virtual machine, in accordance with one or more aspects of the present disclosure. Method 200 and each of its individual functions, routines, subroutines, or operations may be performed by one or more processors of the computing device executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by an executable code of a host machine (e.g., host operating system or firmware), a virtual machine (e.g., guest operating system or virtual firmware), an external device (e.g., a PCI device), other executable code, or a combination thereof.

Method 200 may be performed by processing devices of a server device or a client device and may begin at block 210. At block 210, the processing device generates, by a virtual machine running on a host computer system, a plurality of direct guest physical addresses. Generating the plurality of direct guest physical addresses may be in response to at least one of detecting that the virtual machine is an encrypted virtual machine running a guest operating system or a request to disable an extended page table (EPT).

The plurality of direct guest physical addresses may be outside a range of guest physical addresses allocated for guest memory. As previously described, guest memory may be a predetermined range, thus the plurality of direct guest physical addresses may be an offset from the guest memory predetermined range or start at a predetermined guest physical address (e.g., address at 1 terabyte). The range of the plurality of direct guest physical addresses may correspond to a predetermined size. As previously described, the range of the direct guest physical addresses may start from the offset or predetermined guest physical address and extend the predetermined size.

At block 220, the processing device maps each guest virtual address of a plurality of guest virtual addresses to a direct guest physical address of the plurality of direct guest physical addresses. Mapping may include for each guest virtual address of the plurality of guest virtual addresses, storing, in a page directory entry associated with a respective guest virtual address, a direct guest physical address of the plurality of direct guest physical addresses. The page directory entry may be one of a page global directory table entry, a page upper directory table entry, or page middle directory table entry. The page size bit of the page directory entry may be set to 1, thereby allowing the page directory entry to store the direct guest physical address.

At block 230, the processing device updates for each guest virtual address to direct guest physical address mapping, an entry of a shadow page table with the direct guest physical address to a guest physical address mapping. The shadow page table may be stored in a memory of the hypervisor. The shadow page table may be used by a hypervisor running on the host computer system to generate an extended page table (EPT) mapping each direct guest physical address to a host physical address. As previously described, each range of direct guest physical addresses and range of guest virtual addresses are associated with the application, the shadow page table may correspond to the application. The shadow page table stores, in each record, a translation of the direct guest physical addresses to guest physical addresses and is used to indicate to hypervisor a state of translation the guest OS expects from the hypervisor.

In some embodiments, the hypervisor generates an extended page table, based on the shadow table, that translates direct guest physical addresses to host physical addresses of hypervisor memory.

Figure 3:
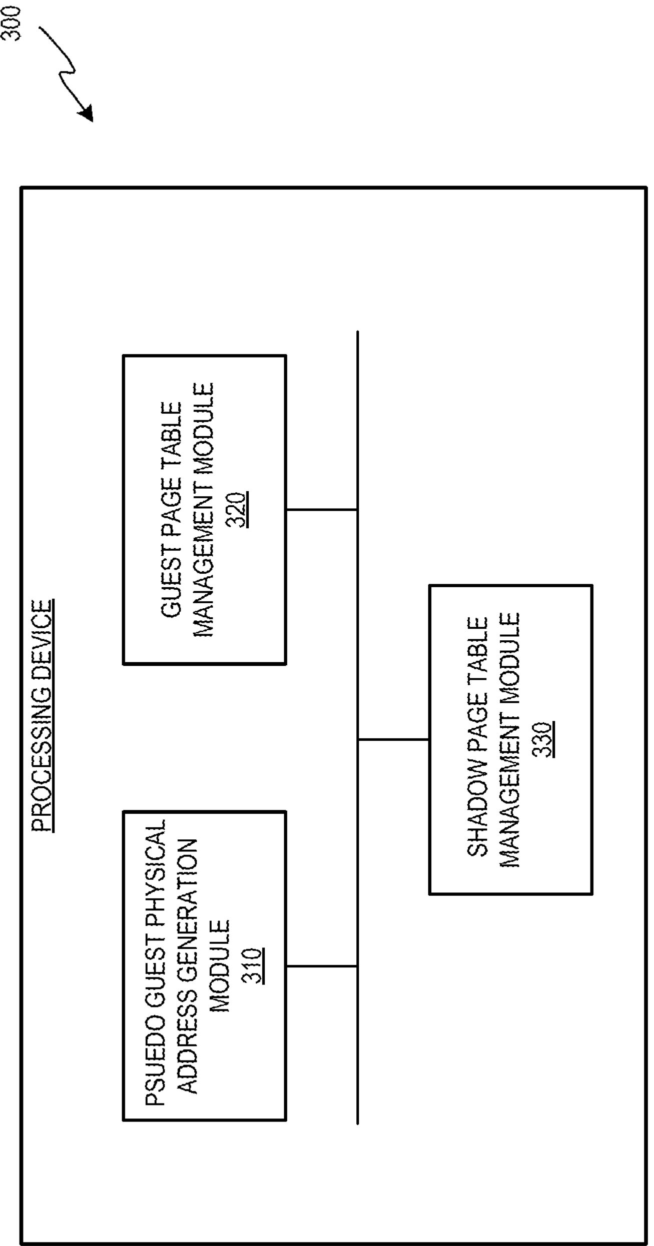
FIG. 3 depicts a block diagram of a computer system operating in accordance with one or more aspects of the present disclosure.

FIG. 3 depicts a block diagram of a computer system 300 operating in accordance with one or more aspects of the present disclosure. One or more of the components of FIG. 1 may execute on computer system 300. Computer system 300 may be the same or similar to host machine 100 of FIG. 1, and may include one or more processors and one or more memory devices. In the example shown, computer system 300 may include a direct guest physical address generation module 310, a guest page table management module 320, and a shadow page table management module 330.

Direct guest physical address generation module 310 may determine that the guest OS (e.g., guest operating system 112 of FIG. 1) is running in an encrypted VM (e.g., VM 110 of FIG. 1). The direct guest physical address generation module 310 identifies a range of direct guest physical addresses which are outside the range of guest physical addresses of the guest memory (e.g., guest memory 114 of FIG. 1) of the guest OS. As previously described, the direct guest physical address generation module 310 may identify a range of direct guest physical addresses based on an offset from the guest physical address of the guest memory plus a predetermined size of the range of direct guest physical addresses. The direct guest physical address generation module 310 may identify a range of direct guest physical addresses based on a predetermined address of a first direct guest physical address plus a predetermined size of the range of direct guest physical addresses. The direct guest physical address generation module 310 may identify a contiguous range of direct guest physical addresses so that a few entries of a page directory may be used to translate range of direct guest physical addresses.

Guest page table management module 320 may identify a range of guest virtual addresses to map to the range of direct guest physical addresses. The guest page table management module 320 may update guest page tables to translate the guest virtual addresses (e.g., the range of the guest virtual addresses) to direct guest physical addresses (e.g., the range of direct guest physical addresses). In particular, guest page table management module 320 may, for each guest virtual address of the range of guest virtual addresses, update an entry of the guest page table. For example, the guest page table management module 320 identifies an entry of a page directory (e.g., PGD, PUD, or PMD) using the guest virtual address and updates the entry of the page directory with a direct guest physical address of the direct guest physical addresses.

Shadow page table management module 330 may update, based on the guest page table, a shadow page table. The shadow page table represents a page table in which the guest OS indicates to a hypervisor a state of translation the guest OS expects from the hypervisor. Accordingly, the hypervisor may utilize the shadow page table to generate an extended page table that translates direct guest physical addresses to host physical addresses of a hypervisor memory of the hypervisor 120. In some embodiments, shadow page table management module 330 may update the shadow page table each time a guest page table is updated with a direct guest physical address. In some embodiments, may update the shadow page table after the direct guest physical addresses mapped to guest virtual addresses are updated in the guest page tables.

FIG. 4 depicts a flow diagram of an example method 400 for extended page table for encrypted virtual machine, in accordance with one or more aspects of the present disclosure. Method 400 and each of its individual functions, routines, subroutines, or operations may be performed by one or more processors of the computing device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by an executable code of a host machine (e.g., host operating system or firmware), a virtual machine (e.g., guest operating system or virtual firmware), an external device (e.g., a PCI device), other executable code, or a combination thereof.

Method 400 may be performed by processing devices of a server device or a client device and may begin at block 410. At block 410, the processing device identifies, in memory of a hypervisor running on a host computer system, a shadow page table. Each entry of a plurality of entries of the shadow page table may include a direct guest physical address to guest physical address mapping.

The shadow page table may be updated for each guest virtual address of a plurality of guest virtual addresses mapped to a direct guest physical address of a plurality of direct guest physical addresses. Generating the plurality of direct guest physical addresses may be in response to at least one of detecting that the virtual machine is an encrypted virtual machine running a guest operating system or a request to disable extended page table (EPT).

The plurality of direct guest physical addresses may be outside a range of guest physical addresses allocated for guest memory. As previously described, guest memory may be a predetermined range, thus the plurality of direct guest physical addresses may be an offset from the guest memory predetermined range or start at a predetermined guest physical address (e.g., address at 1 terabyte). The range of the plurality of direct guest physical addresses may correspond to a predetermined size. As previously described, the range of the direct guest physical addresses may start from the offset or predetermined guest physical address and extend the predetermined size. The plurality of guest virtual addresses may be contiguous and corresponds to an application running within a virtual machine on the host computer system.

At block 420, the processing device generates, using the shadow page table, an extended page table (EPT) mapping. Each entry of a plurality of entries of the extended page table mapping may include a direct guest physical address to host physical address mapping. As previously described, the hypervisor generates (or updates) the extended page table (EPT) periodically every predetermined time period or at will. In some embodiments, the hypervisor generates (or updates) the extended page table (EPT) on demand in response to detecting that an application is attempting to access hypervisor memory using a direct guest physical address.

Figure 5:
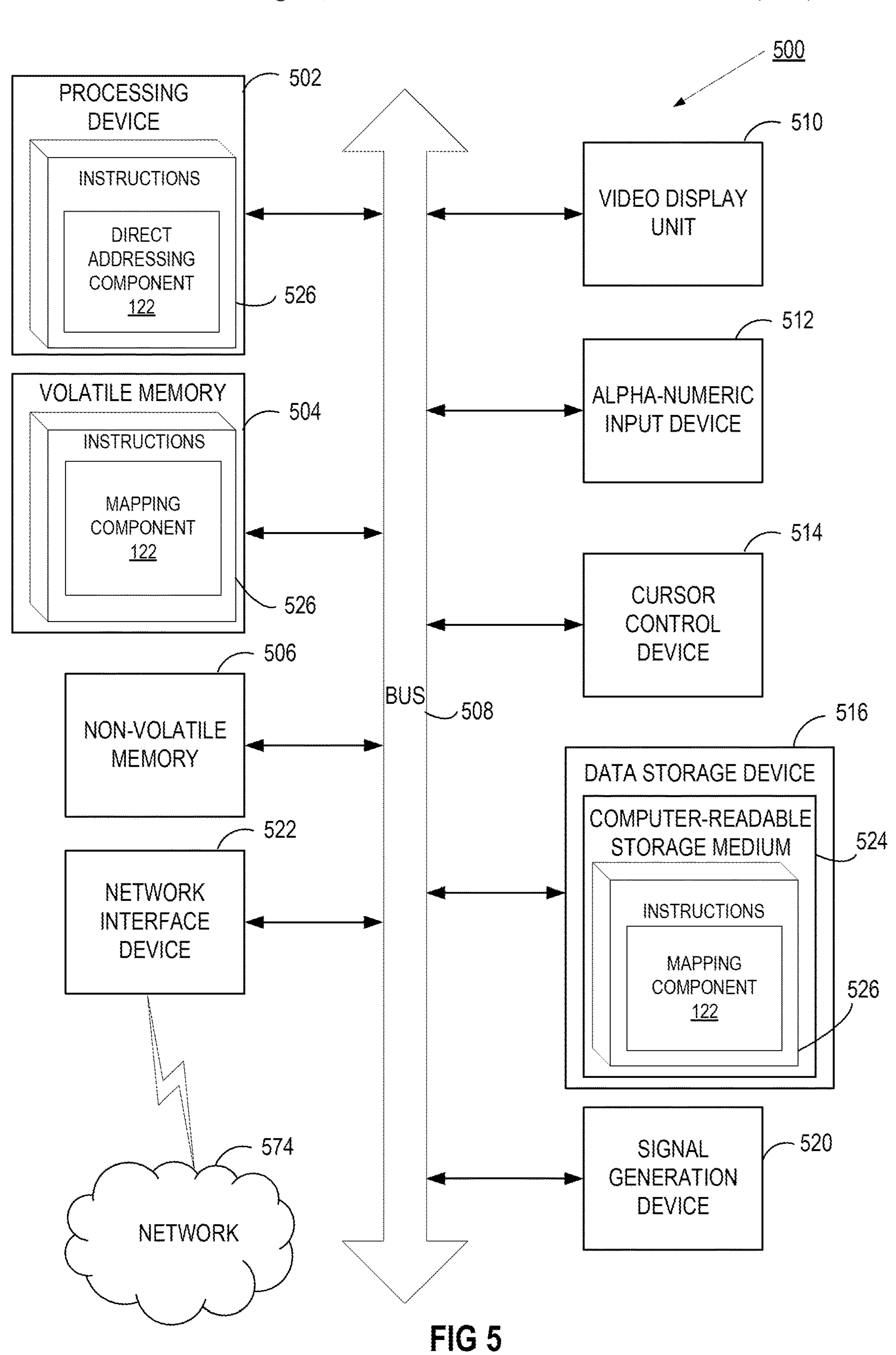
FIG. 5 depicts a block diagram of an example computer system operating in accordance with one or more aspects of the present disclosure.

FIG. 5 depicts a block diagram of a computer system operating in accordance with one or more aspects of the present disclosure. In various illustrative examples, computer system 500 may correspond to computing environment 100 of FIG. 1. Computer system 500 may be included within a data center that supports virtualization. Virtualization within a data center result in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peerto-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for implementing method 400.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating" "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general-purpose computer system selectively programmed by a computer program stored in the computer system. Such a computer program may be stored in a computer-readable tangible storage medium.

The methods and illustrative examples described herein are not inherently related to any particular computer or other apparatus. Various general-purpose systems may be used in accordance with the teachings described herein, or it may prove convenient to construct more specialized apparatus to perform method 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:

generating, by a virtual machine running on a host computer system, a plurality of direct guest physical addresses, wherein the plurality of direct guest physical addresses is outside a range of guest physical addresses allocated for guest memory;

mapping, by the virtual machine, each respective guest virtual address of a plurality of guest virtual addresses to a respective direct guest physical address of the plurality of direct guest physical addresses to generate a plurality of guest virtual address to direct guest physical address mappings; and for each guest virtual address to direct guest physical address mapping, updating, by a hypervisor running on the host computer system, a mapping entry of a shadow page table that maps the direct guest physical address to a guest physical address, wherein updating the mapping entry of the shadow page table further includes:

for each mapping entry of the shadow page table, generating, by the hypervisor, an extended page table (EPT) mapping entry that maps the direct guest physical address to a host physical address.

2. The method of claim 1, wherein mapping each respective guest virtual address of the plurality of guest virtual addresses to a respective direct guest physical address of the plurality of direct guest physical addresses comprises:

for each respective guest virtual address of the plurality of guest virtual addresses, storing, in a page directory entry associated with the respective guest virtual address, a respective direct guest physical address of the plurality of direct guest physical addresses.

3. The method of claim 2, wherein the page directory entry is one of: a page global directory table entry, a page upper directory table entry, or page middle directory table entry.

4. The method of claim 2, wherein a page size bit of the page directory entry is set to 1.

5. The method of claim 1, wherein generating the plurality of direct guest physical addresses is performed in response to at least one of: detecting that the virtual machine is an encrypted virtual machine running a guest operating system or receiving a request to disable extended page table (EPT).

6. The method of claim 1, wherein the shadow page table is stored in a memory accessible by the hypervisor.

7. The method of claim 1, wherein a range of the plurality of direct guest physical addresses corresponds to a predetermined size.

8. A system comprising:

a memory device;

a processing device, operatively coupled to the memory device, to perform operations comprising:

generating, by a virtual machine running on a host computer system, a plurality of direct guest physical addresses, wherein the plurality of direct guest physical addresses is outside a range of guest physical addresses allocated for guest memory;

mapping, by the virtual machine running on the host computer system, each respective guest virtual address of a plurality of guest virtual addresses to a respective direct guest physical address of the plurality of direct guest physical addresses to generate a plurality of guest virtual address to direct guest physical address mappings; and for each guest virtual address to direct guest physical address mapping, updating, by a hypervisor running on the host computer system, a mapping entry of a shadow page table the that maps the direct guest physical address to a guest physical address mapping, wherein updating the mapping entry of the shadow page table further includes:

for each mapping entry of the shadow page table, generating, by the hypervisor, an extended page table (EPT) mapping entry that maps the direct guest physical address to a host physical address.

9. The system of claim 8, wherein mapping each respective guest virtual address of the plurality of guest virtual addresses to a respective direct guest physical address of the plurality of direct guest physical addresses comprises:

for each respective guest virtual address of the plurality of guest virtual addresses, storing, in a page directory entry associated with the respective guest virtual address, the respective direct guest physical address of the plurality of direct guest physical addresses.

10. The system of claim 9, wherein the page directory entry is one of: a page global directory table entry, a page upper directory table entry, or page middle directory table entry.

11. The system of claim 8, wherein the plurality of guest virtual addresses is contiguous and corresponds to an application running within the virtual machine.

12. The system of claim 8, wherein the shadow page table is stored in a memory of the hypervisor.

13. The system of claim 8, wherein the plurality of direct guest physical addresses is contiguous.

14. The system of claim 8, wherein a range of the plurality of direct guest physical addresses corresponds to a predetermined size.

15. A non-transitory computer-readable storage medium including instructions that, when executed by a processing device, cause the processing device to perform a method comprising:

updating, in memory of a hypervisor running on a host computer system, a plurality of entries of a shadow page table, wherein each entry of the plurality of entries of the shadow page table includes a direct guest physical address to guest physical address mapping associated with a direct guest physical address of a plurality of direct guest physical addresses outside a range of guest physical addresses allocated for guest memory; and for each entry of the plurality of entries of the shadow page table, generating, using the shadow page table, an extended page table, wherein each entry of a plurality of entries of the extended page table includes a direct guest physical address to host physical address mapping.

16. The non-transitory computer-readable storage medium of claim 15, wherein the shadow page table is updated for each guest virtual address of a plurality of guest virtual addresses mapped to a direct guest physical address of a plurality of direct guest physical addresses.

17. The non-transitory computer-readable storage medium of claim 16, wherein the plurality of guest virtual addresses is contiguous and corresponds to an application running within a virtual machine running on the host computer system.

* * * * *